US008517323B1

(12) United States Patent
Gregory

(10) Patent No.: US 8,517,323 B1
(45) Date of Patent: Aug. 27, 2013

(54) LID HOLDER APPARATUS

(76) Inventor: Leroy Gregory, Yuba City, CA (US)

( * ) Notice: Subject to any disclaimer, the term of this patent is extended or adjusted under 35 U.S.C. 154(b) by 316 days.

(21) Appl. No.: 12/925,384

(22) Filed: Oct. 20, 2010

(51) Int. Cl.
*A47F 5/00* (2006.01)

(52) U.S. Cl.
USPC .............. 248/309.1; 248/186.1; 248/178.1; 248/289.11; 248/311.2; 248/311.3; 211/41.11; 108/26; 108/6

(58) Field of Classification Search
USPC .......... 248/349.1, 309.1, 176.2, 125.7, 178.1, 248/186.1, 186.2, 285.2, 296.1, 311.3, 312, 248/312.1, 240, 240.4, 289.11, 118, 118.1, 248/118.3, 118.5, 282.1, 278.1, 311.2, 111; 403/148; 211/41.11, 85.29, 68, 66, 63, 106; 224/42.35, 42.32, 482, 483, 282; 108/103, 108/26, 45, 6, 93
See application file for complete search history.

(56) References Cited

U.S. PATENT DOCUMENTS

| 88,777 | A | * | 4/1869 | Doudna | 126/332 |
|---|---|---|---|---|---|
| 102,530 | A | * | 5/1870 | Gammel | 108/26 |
| 104,214 | A | * | 6/1870 | See | 473/39 |
| 294,293 | A | * | 2/1884 | Walch | 131/239 |
| 409,887 | A | * | 8/1889 | Walker | 248/298.1 |
| 444,079 | A | * | 1/1891 | Van | 211/106 |
| 484,718 | A | * | 10/1892 | Isaacs | 273/284 |
| 498,064 | A | * | 5/1893 | Korb et al. | 206/134 |
| 573,960 | A | * | 12/1896 | Bruss | 108/26 |
| 593,985 | A | * | 11/1897 | Colton | 248/289.11 |
| 634,526 | A | * | 10/1899 | Holmes | 211/63 |
| 680,680 | A | * | 8/1901 | Armstrong et al. | 248/231.71 |
| 952,107 | A | * | 3/1910 | Furber | 248/312 |
| 1,030,402 | A | * | 6/1912 | Herber et al. | 248/312 |
| 1,098,482 | A | * | 6/1914 | Combes | 312/329 |
| 1,222,486 | A | * | 4/1917 | Swanson | 248/312 |
| 1,664,124 | A | * | 3/1928 | Lorenz | 248/279.1 |
| 1,675,931 | A | * | 7/1928 | Gullette | 362/549 |
| 1,801,637 | A | * | 4/1931 | Nichols | 248/231.71 |
| 1,862,661 | A | * | 6/1932 | Cohen | 131/235.1 |
| 1,910,091 | A | * | 5/1933 | Collier | 248/282.1 |
| 1,912,682 | A | * | 6/1933 | Belt | 131/241 |
| 1,931,093 | A | * | 10/1933 | Sinko | 248/289.11 |
| 1,979,301 | A | * | 11/1934 | Webb | 108/93 |
| 1,989,436 | A | * | 1/1935 | Weigand | 248/312 |
| 2,165,654 | A | | 7/1939 | Rosenthal | |
| 2,202,365 | A | * | 5/1940 | Zeman | 248/311.2 |
| 2,375,565 | A | * | 5/1945 | Liakopulos | 248/282.1 |
| 2,662,717 | A | | 12/1953 | Johnson | |
| 2,690,950 | A | * | 10/1954 | Nordmark | 312/310 |
| 3,184,198 | A | * | 5/1965 | Morgan | 248/222.51 |
| 3,192,894 | A | | 7/1965 | Staver | |
| 3,255,719 | A | * | 6/1966 | Klavins | 108/26 |
| 4,844,388 | A | * | 7/1989 | Kuba et al. | 108/5 |
| 4,998,627 | A | | 3/1991 | Elder | |
| 5,038,945 | A | | 8/1991 | Melkonian | |
| 5,070,795 | A | * | 12/1991 | Redlin et al. | 108/26 |
| 5,170,978 | A | | 12/1992 | Hoffman | |
| 5,242,060 | A | | 9/1993 | Chiang et al. | |
| 5,246,195 | A | | 9/1993 | Huff | |
| 5,297,766 | A | | 3/1994 | Hoffman | |
| 5,396,993 | A | | 3/1995 | Spitler | |

(Continued)

*Primary Examiner* — Kimberly Wood
(74) *Attorney, Agent, or Firm* — Thomas R. Lampe

(57) ABSTRACT

Lid holder apparatus including a lid holder body is attached to the bottom horizontal surface of a cabinet and is pivotally movable between a position in which the lid holder body is completely under the cabinet and a position wherein the lid holder body extends from the cabinet and is utilized to hold a lid upside down.

1 Claim, 2 Drawing Sheets

(56) References Cited

U.S. PATENT DOCUMENTS

| | | | |
|---|---|---|---|
| 5,586,804 A * | 12/1996 | Burroughs | 297/188.08 |
| 5,799,913 A * | 9/1998 | Preston, Sr. | 248/146 |
| 5,810,308 A | 9/1998 | Lam | |
| 5,832,840 A * | 11/1998 | Woof | 108/6 |
| 5,984,244 A * | 11/1999 | Hirschovits et al. | 248/118 |
| 6,003,688 A | 12/1999 | Steidle | |
| 6,109,571 A * | 8/2000 | Hirschovits et al. | 248/118 |
| 6,311,939 B1 * | 11/2001 | Christensen | 248/118.3 |
| 6,318,690 B1 * | 11/2001 | Chang et al. | 248/312 |
| 6,378,826 B1 * | 4/2002 | Knaub et al. | 248/229.21 |
| 6,379,826 B1 * | 4/2002 | Lacy | 429/432 |
| 6,997,329 B2 | 2/2006 | Ohanian | |
| 7,481,170 B2 * | 1/2009 | Sommerfield | 108/103 |

* cited by examiner

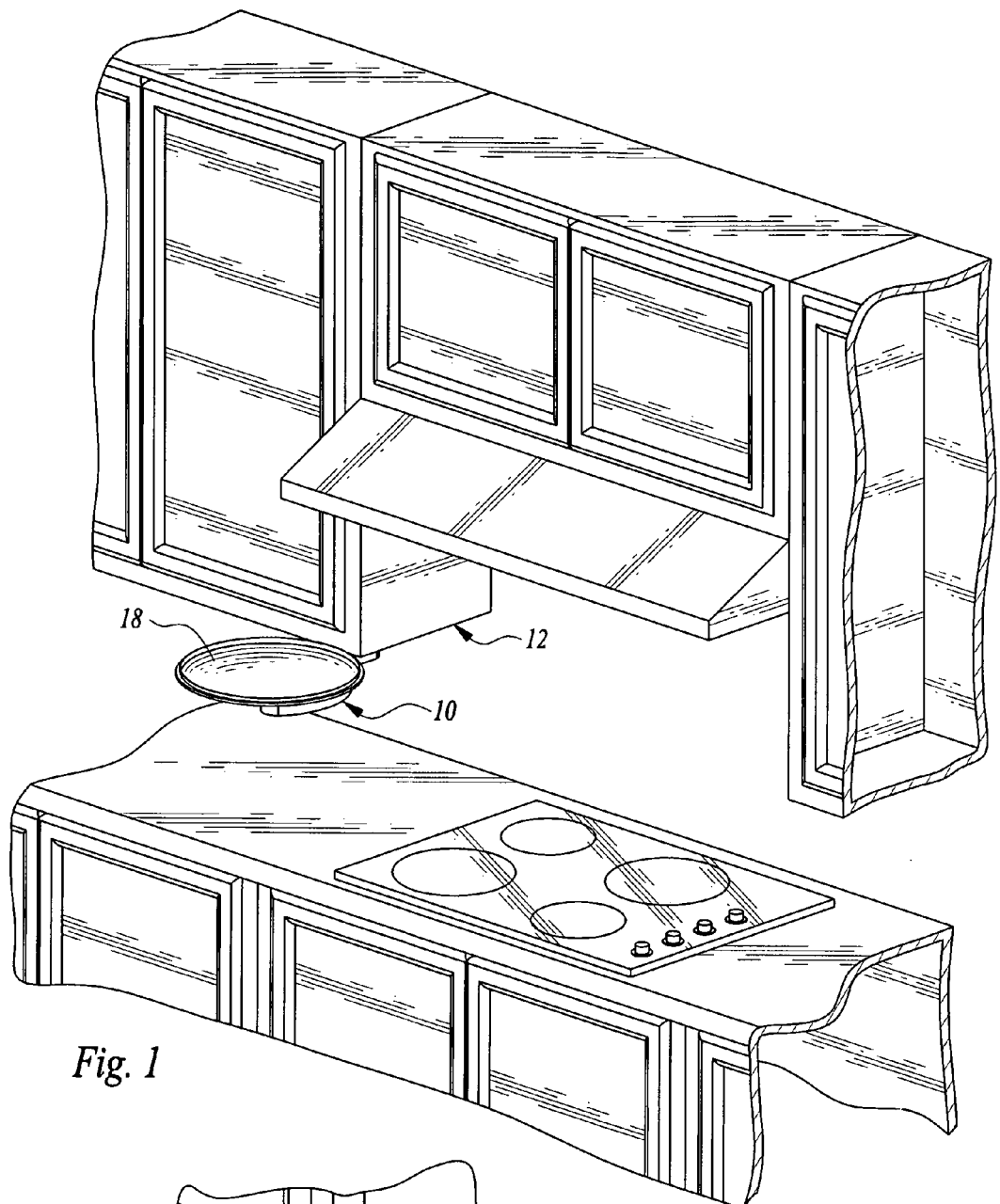
Fig. 1
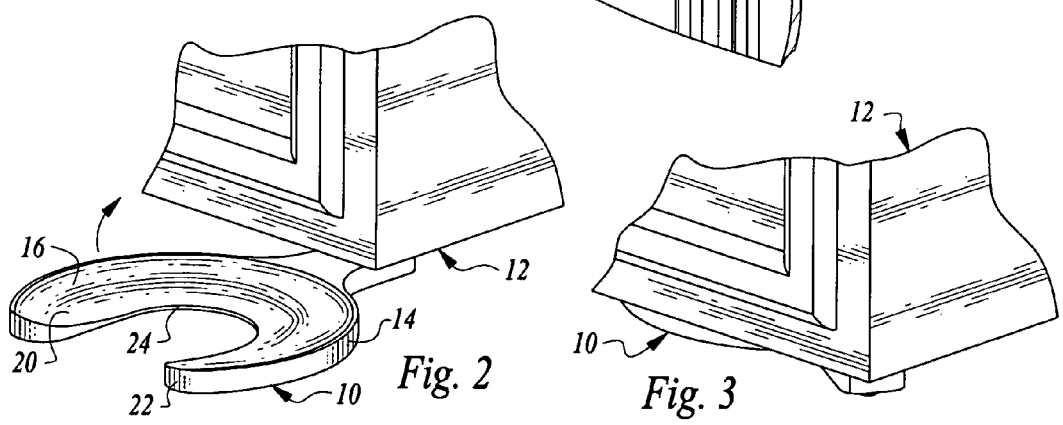
Fig. 2
Fig. 3

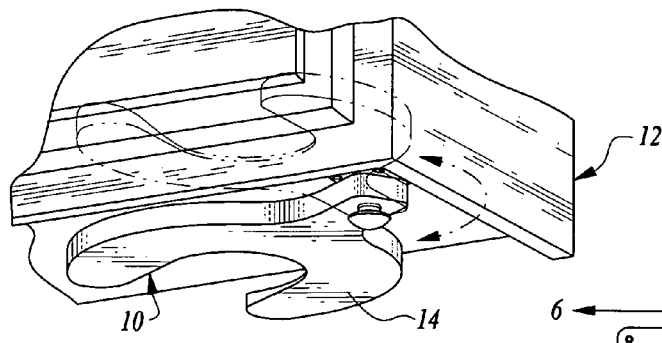
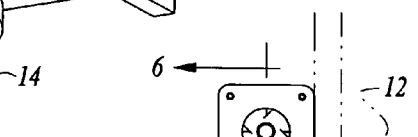
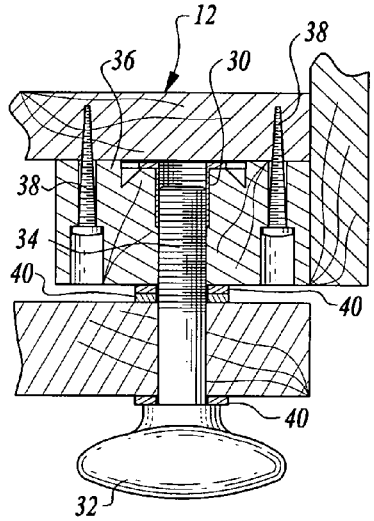
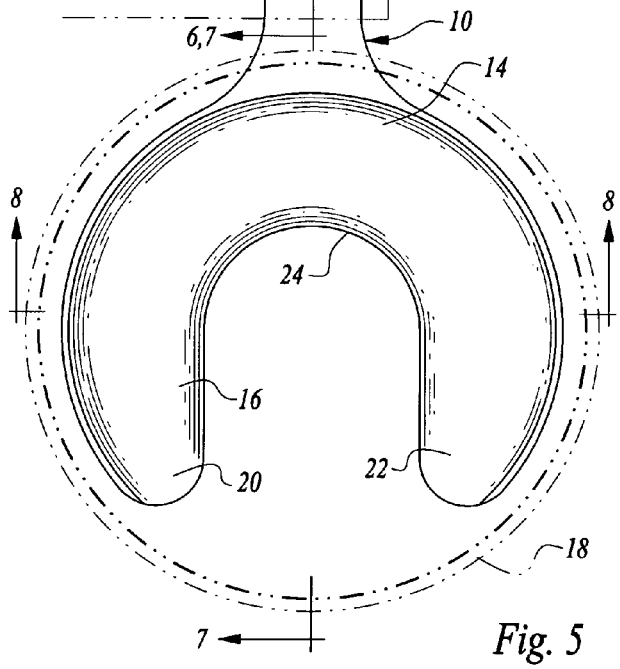
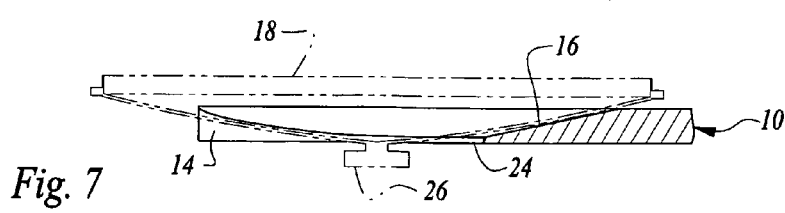
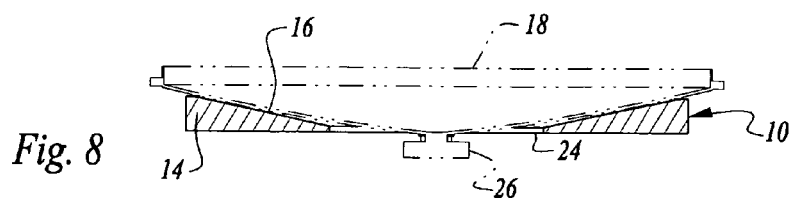
Fig. 4
Fig. 6
Fig. 5
Fig. 7
Fig. 8

US 8,517,323 B1

LID HOLDER APPARATUS

TECHNICAL FIELD

This invention relates to lid holder apparatus for supporting a pot or pan lid.

BACKGROUND OF THE INVENTION

Pot and pan lid holders are well known generally. The following patents illustrate lid holder devices which are believed to be representative of the current state of the prior art: U.S. Pat. No. 5,170,978, issued Dec. 15, 1992, U.S. Pat. No. 5,297,766, issued Mar. 29, 1994, U.S. Pat. No. 2,662,717, issued Dec. 15, 1953, U.S. Pat. No. 2,165,654, issued Jul. 11, 1939, U.S. Pat. No. 4,998,627, issued Mar. 12, 1991, U.S. Pat. No. 6,003,688, issued Dec. 21, 1999, U.S. Pat. No. 5,810,308, issued Sep. 22, 1998, U.S. Pat. No. 5,396,993, issued Mar. 14, 1995, U.S. Pat. No. 6,997,329, issued Feb. 14, 2006, U.S. Pat. No. 5,246,195, issued Sep. 21, 1993, U.S. Pat. No. 5,242,060, issued Sep. 7, 1993, U.S. Pat. No. 5,038,945, issued Aug. 13, 1991 and U.S. Pat. No. 3,192,894, issued Jul. 6, 1965.

DISCLOSURE OF INVENTION

The lid holder apparatus of the present invention incorporates desirable structural features not taught or suggested by the known prior art arrangements. One attribute of the present invention is that it provides a means whereby a pot or pan lid is held in an inverted or upside down condition. Thus, no liquids or other materials adhering to the inner surface of the lid will leak or flow from the lid.

Another feature involves attachment of the apparatus at the bottom horizontal surface of a cabinet or other structure, the lid holder body of the apparatus being movable from a first position wherein the lid holder body is stored out of the way under the bottom horizontal surface and a second position wherein the lid holder body projects outwardly from the cabinet or other structure with which it is associated to selectively facilitate placement of the lid upside down on the lid holder body or manual removal of the lid from the lid holder body.

Other features, advantages and objects of the present invention will become apparent with reference to the following description and accompanying drawings.

BRIEF DESCRIPTION OF DRAWINGS

FIG. 1 is a perspective view of lid holder apparatus of the present invention attached to the bottom of a kitchen cabinet, the lid holder body of the apparatus and a lid supported thereby being shown in a position providing ready access to the lid;

FIG. 2 is an enlarged, perspective view illustrating a portion of the cabinet and the lid holder body extending therefrom prior to being moved to a storage position under the cabinet;

FIG. 3 is a view similar to FIG. 2, but illustrating the lid holder body disposed under the cabinet;

FIG. 4 is a perspective view showing the underside or bottom surface of the cabinet with the lid holder body shown in solid lines when completely disposed under the cabinet and in phantom lines to depict the holder body in the position assumed thereby when projecting from the cabinet;

FIG. 5 is an enlarged, top plan view of the lid holder apparatus with the lid holder body thereof projecting outwardly from the cabinet, a portion of the cabinet and a lid positionable on the lid holder body being depicted in broken lines;

FIG. 6 is an enlarged, cross-sectional view taken along the line 6-6 in FIG. 5;

FIG. 7 is a cross-sectional view taken along the line 7-7 in FIG. 5; and

FIG. 8 is a cross-sectional view taken along line 8-8 of FIG. 5.

BEST MODE FOR CARRYING OUT THE INVENTION

Referring now to the drawings, lid holder apparatus constructed in accordance with the teachings of the present invention is designated by reference numeral 10. The lid holder apparatus is attached at the bottom horizontal surface of a kitchen cabinet 12.

The lid holder apparatus includes a lid holder body 14 having an upwardly directed lid engagement surface 16 engageable by the inverted upper outer surface of a pot or pan lid to support the lid upside down. In FIGS. 1, 5, 7 and 8, a lid 18 is illustrated in its inverted or upside down condition on the lid holder body.

The lid holder body 14 has a generally U-shaped configuration and includes two lid holder body portions 20, 22 having spaced distal ends and defining an opening 24. The opening 24 extends to the center of the lid holder body, as shown. The opening receives a handle 26 on the lid when the lid 18 is supported upside down by the lid holder body (FIGS. 7 and 8).

As may perhaps best be seen with reference to FIGS. 7 and 8, the upwardly directed lid engagement surface 16 of the lid holder body inclines downwardly in the direction of opening 24 at the center of the lid holder body. Thus, the upwardly directed lid engagement surface 16 generally conforms to the shape of the lid and ensures stable positioning of the lid relative to the lid holder body. The lid holder body may be constructed of any suitable material, such as wood, plastic or metal.

When the lid is positioned on the lid holder body, the inner surface of the lid is disposed upwardly and thus there is no danger that liquid or other material at the inner surface of the lid will leak or fall from the lid held by the lid holder apparatus.

The lid holder apparatus includes connector structure for pivotally attaching the lid holder body to the bottom horizontal surface of the cabinet whereby the lid holder body may be selectively pivotally moved between a first position wherein the lid holder body is substantially completely disposed under the bottom horizontal surface and a second position wherein the lid holder body projects outwardly from the cabinet to selectively facilitate placement of the lid upside down on the lid holder body or manual removal of the lid from the lid holder body.

Referring to FIG. 6, the connector structure includes hardware 30 connected to the bottom horizontal surface of the cabinet and defining internal screw threads. The connector structure further includes a handle or knob 32 having an externally threaded bolt segment 34 extending through the lid holder body into threaded engagement with the internal screw threads defined by hardware 30. In the arrangement illustrated, hardware 30 is maintained in place by a retention block 36 secured to the bottom of the cabinet by wood screws 38. Other suitable fastener arrangements may be utilized. Washers 40 are disposed about the threaded bolt segment 34, two of the washers in the illustrated embodiment being located between hardware 30 and the lid holder body 14 to facilitate relative pivotal movement therebetween. The threadedly interconnected hardware and handle 32 are selectively relatively adjustable to alternatively allow pivotal movement of the lid holder body or lock the lid holder body against pivotal movement, if desired.

The invention claimed is:

1. In combination:
    a cabinet or other structure having a bottom horizontal surface and lid holder apparatus attached at the bottom horizontal surface, said lid holder apparatus including:
    a lid holder body having an upwardly directed lid engagement surface engaging an inverted curved outwardly projecting upper outer surface of a pot or pan lid to support the lid upside down with the inner surface of the lid disposed upwardly whereby any liquid in the lid is prevented from leaking or falling, said lid holder body defining an opening receiving a centrally disposed handle on the lid when said lid is supported upside down by the lid holder body; and
    connector structure pivotally attaching said lid holder body to the bottom horizontal surface whereby said lid holder body may be selectively pivotally moved between a first position wherein said lid holder body is completely disposed under said bottom horizontal surface and a second position wherein said lid holder body and said lid project outwardly from said cabinet or other structure to selectively facilitate placement of said lid upside down on said lid holder body or manual removal of said lid from said lid holder body, said lid holder body having a generally U-shaped configuration and including two lid holder body portions having spaced distal ends and defining said opening, said opening extending to the center of said lid holder body and said upwardly directed lid engagement surface inclining down and along the length thereof in the direction of said opening at the center of said lid holder body and cooperably engaged with the inverted curved outwardly projecting upper outer surface of said lid to substantially center said lid on said lid holder body, said connector structure including hardware attached to the bottom horizontal surface of said cabinet or other structure and defining internal screw threads and a handle having an externally threaded bolt segment extending through said lid holder body into threaded engagement with the internal screw threads defined by said hardware, said threadedly interconnected hardware and handle selectively relatively adjustable to alternatively allow pivotal movement of said lid holder body or lock said lid holder body against pivotal movement, at least one spacer about said threaded bolt segment located between said hardware and said lid holder body to facilitate relative pivotal movement therebetween, said spacer positioning said lid holder body a distance below the bottom horizontal surface sufficient to prevent engagement of said lid with the cabinet or other structure when said holder body and said lid are in said first position or when being moved from said first position to said second position.

* * * * *